United States Patent [19]
Kukino et al.

[11] Patent Number: 6,008,153
[45] Date of Patent: Dec. 28, 1999

[54] HIGH-PRESSURE PHASE BORON NITRIDE BASE SINTER

[75] Inventors: Satoru Kukino; Tetsuo Nakai; Junichi Shiraishi; Tomohiro Fukaya; Shinya Uesaka, all of Itami, Japan

[73] Assignee: Sumitomo Electric Industries, Ltd., Osaka, Japan

[21] Appl. No.: 09/101,742

[22] PCT Filed: Dec. 3, 1997

[86] PCT No.: PCT/JP97/04410

§ 371 Date: Jul. 16, 1998

§ 102(e) Date: Jul. 16, 1998

[87] PCT Pub. No.: WO98/24736

PCT Pub. Date: Jun. 11, 1998

[30] Foreign Application Priority Data

Dec. 3, 1996 [JP] Japan .................................. 8-322379

[51] Int. Cl.[6] .................. C04B 35/5831; C04B 35/5835
[52] U.S. Cl. ...................... 501/96.4; 501/96.1; 501/96.3; 501/96.6
[58] Field of Search ................. 501/96.1, 96.4, 501/96.3, 98.6

[56] References Cited

U.S. PATENT DOCUMENTS

| | | | |
|---|---|---|---|
| 4,666,466 | 5/1987 | Wilson . | |
| 5,328,875 | 7/1994 | Ueda et al. | 501/96.4 |
| 5,466,642 | 11/1995 | Tajima et al. | 501/96.4 |
| 5,569,862 | 10/1996 | Kuroyama et al. | 501/96.4 |
| 5,925,585 | 7/1999 | Schoennahl et al. | 501/96.4 |

FOREIGN PATENT DOCUMENTS

| | | |
|---|---|---|
| 55-126581 | 9/1980 | Japan . |
| 58-061253 | 4/1983 | Japan . |
| 58-061254 | 4/1983 | Japan . |
| 58-061255 | 4/1983 | Japan . |
| 58-58247 | 4/1983 | Japan . |
| 58-60678 | 4/1983 | Japan . |
| 58-60679 | 4/1983 | Japan . |
| 58-60680 | 4/1983 | Japan . |
| 02180760 | 7/1990 | Japan . |
| 03205364 | 9/1991 | Japan . |
| 04367566 | 12/1992 | Japan . |
| 05024929 | 2/1993 | Japan . |
| 05051267 | 3/1993 | Japan . |
| 05139844 | 6/1993 | Japan . |
| 05163071 | 6/1993 | Japan . |
| 05186272 | 7/1993 | Japan . |
| 05186844 | 7/1993 | Japan . |
| 05186845 | 7/1993 | Japan . |
| 05310474 | 11/1993 | Japan . |
| 06219841 | 8/1994 | Japan . |
| 08081271 | 3/1996 | Japan . |

*Primary Examiner*—Karl Group
*Attorney, Agent, or Firm*—W. F. Fasse; W. G. Fasse

[57] ABSTRACT

A high-pressure phase boron nitride-based high-hardness high-strength sintered body for cutting tools represented by a milling tool and an end mill etc., which is improved in wear resistance and chipping resistance, is obtained. The high-pressure phase boron nitride-based sintered body according to the present invention comprises a plurality of grains (1) of high-pressure phase boron nitride and a binder phase (2, 3), and the content of the aforementioned grains (1) is at least 20.0 volume % and not more than 99.7 volume %. The aforementioned binder phase (2, 3) includes a first binder phase (2) enclosing the aforementioned grains (1) and a second binder phase (3) other than that. The first binder phase (2) consists of the form of at least either a nitride of at least one of Ti, TiAl, Zr and Hf or a solid solution thereof. The aforementioned second binder phase (3) includes a grain growth suppressive binder phase (4) between a plurality of the aforementioned grains (1) enclosed with the aforementioned first binder phase (2).

22 Claims, 2 Drawing Sheets

2  1    4    2  1  3

6 5 1    3    1 5 6
 ⎵              ⎵
 2              2

HIGH-PRESSURE PHASE BORON NITRIDE BASE SINTER

TECHNICAL FIELD

The present invention relates to a high-pressure phase boron nitride-based sintered body, and more particularly, it relates to a high-pressure phase boron nitride-based sintered body for a cutting tool, which is improved in wear resistance and chipping resistance.

BACKGROUND TECHNIQUE

High-pressure phase boron nitride represented by cubic boron nitride (hereinafter referred to as cBN) is the next high-hardness material to diamond, and its reactivity with a ferrous material is low as compared with diamond, and hence cBN-based sintered bodies are used for various cutting tools.

Further, a material which is of high hardness and high strength is earnestly desired not only in a cutting application but also in various applications such as a wear-resistant part provided on a sliding part and a shock-resistant part employed for a defensive wall, for example. In a conventional high-pressure phase boron nitride-based sintered body, however, there has been a problem in compatibility of hardness and strength, and no sufficient performance has been attained.

At this point, cBN is a typical non-sinterable material ranking with diamond, and is a high-pressure stable phase. Therefore, extreme sintering conditions of 2000° C. and at least 8 GPa are required, in order to sinter cBN grains. Therefore, cBN grains cannot be bonded to each other under industrial sintering conditions of 1450° C. and not more than 4.5 GPa. Therefore, it is necessary to sinter cBN powder and binder powder after mixing, in order to prepare a cBN-based sintered body under industrial sintering conditions. Powder of Al, Ti Al, Ti $Al_3$, TiN or TiC is employed as this binder powder. And, cBN-based sintered bodies industrially produced by employing a binder (hereinafter referred to as an Al-based binder) consisting of an Al metal or an intermetallic compound of at least one of Al elements can be roughly classified into the following two types:

It is disclosed in Japanese Patent Laying-Open Gazette No. 55-126581 that a cBN-based sintered body (A) consisting of at least 80 weight % of cBN and a binder phase is obtained by performing sintering while employing cBN grains and Al as starting materials. This is because metallic Al or an intermetallic compound of Al such as Ti $Al_3$ causes fused Al in a high-temperature state in sintering and promotes formation of neck growth between the cBN grains. At this point, neck growth indicates such a state that the cBN grains are fused or bonded and a continuous mosaic or an alternate material is generated. A cBN-based sintered body having a cBN content of 85 to 90 volume % is worked into a product in practice. The transverse rupture strength of this cBN-based sintered body is about 80 to 100 kgf/mm² under a condition of a 4 mm span with a test piece of 6 mm in length, 3 mm in width and 0.4 to 0.45 mm in thickness.

On the other hand, a cBN-based sintered body (B) consisting of about 50 to 80 volume % of cBN and a binder phase is obtained by performing sintering while employing cBN grains, an Al-based binder and a nitride or a carbide of an element of the group 4a, 5a or 6a of the periodic table represented by TiN and TiC and the like or a solid solution thereof (hereinafter referred to as a transition metal nitride or the like) as starting materials. This is because metallic Al or an intermetallic compound of Al such as $TiAl_3$ causes fused Al in a high-temperature state in sintering, forms reaction products between the cBN grains and grains of the transition metal nitride or the like and between the grains of the transition metal nitride or the like, and forms strong binding. A cBN-based sintered body having a cBN content of about 50 to 80 volume % is worked into a product in practice, as a high-strength cutting tool employed for an intermittent cutting application or the like. The transverse rupture strength of this cBN-based sintered body is about 90 to 110 kgf/mm² under a condition of a 4 mm span with a test piece for measurement of 6 mm in length, 3 mm in width and 0.4 to 0.45 mm in thickness.

The theoretical strength of the cBN grains is about 70 GPa when estimated from the Young's modulus. Further, the theoretical strength of the grains of the transition metal nitride or the like is about 20 to 50 GPa. In reality, however, the aforementioned cBN-based sintered body (A) is lower in transverse rupture strength than the aforementioned cBN-based sintered body (B), although the content of the cBN grains having high theoretical strength is high. Namely, the aforementioned cBN-based sintered body (B) is of higher strength than the aforementioned cBN-based sintered body (A) having neck growth between the cBN grains as the main of the bonding form of the constituent grains. Thus, it is understood that the bond strength between the cBN grains and the grains of the transition metal nitride or the like and between the grains of the transition metal nitride or the like is stronger than the bond strength by the neck growth between the cBN grains.

However, the aforementioned cBN-based sintered body (B) is prepared by mixing and charging the Al-based binder, the cBN powder and the transition metal nitride or the like and thereafter sintering the same, as hereinabove described. The Al-based binder has a function of neck-growing the cBN grains, as hereinabove described. In the conventional mixing state, therefore, a region where the cBN grains are in contact with each other through the Al-based binder and a region where the cBN grains are directly in contact with each other and the Al-based binder exists in the vicinity thereof have been present to no small extent. Therefore, a region where the aforementioned cBN grains cause neck growth has been generated in sintering. Consequently, holding power for the cBN grains weakens due to the occurrence of the neck growth also in the aforementioned cBN-based sintered body (B), and there has been such a problem that sufficient wear resistance and chipping resistance have not been exhibited when compared with an ideal cBN-based sintered body.

There are Japanese Patent Laying-Open Gazette No. 58-58247, Japanese Patent Laying-Open Gazette No. 58-60678, Japanese Patent Laying-Open Gazette No. 5-186844 and Japanese Patent Laying-Open Gazette No. 58-61253 as those proposed in order to solve such a problem.

In Japanese Patent Laying-Open Gazette No. 58-58247, there is disclosed a high-toughness boron nitride-based sintered body for cutting and wear-resistant tools comprising cBN or wurtzite boron nitride (hereinafter referred to as wBN) and a binder phase. The aforementioned binder phase consists of a boride and a carbide of at least one of Ti, Hf, Zr and Mo. At least either the aforementioned cBN or wBN is enclosed with the aforementioned boride which is 0.1 to 2 μm in mean thickness.

In Japanese Patent Laying-Open Gazette No. 58-60678, there is disclosed a high-toughness boron nitride-based sintered body for cutting and wear-resistant tools comprising at least either cBN or wBN and a binder phase consisting of a nitride and a carbide of at least one of Ti, Hf and Si. At least either the aforementioned cBN or wBN is enclosed with the aforementioned boride whose mean thickness is 0.1 to 2 μm.

In Japanese Patent Laying-Open Gazette No. 5-186844, further, there is disclosed a sintered body containing high-density phase boron nitride, comprising at least either cBN or wBN and a binder phase consisting of a carbide, a nitride, an oxide or a boride of a metal of the group 4a, 5a or 6a of the periodic table, Al, Si, Fe, Ni or Co, an oxide or a nitride of a rare earth metal or a solid solution thereof, or Fe, Ni and Go. The aforementioned sintered body is obtained by sintering a composite hard phase prepared by coating at least either cBN or wBN with at least one of a nitride and a boride of Ti, Hf, Zr, Mo, Al or Si and a solid solution of these having a mean thickness of 0.5 to 90 nm.

In Japanese Patent Laying-Open Gazette No. 58-61253, further, there is disclosed a high-toughness material boron nitride-based sintered body for cutting and wear-resistant tools, which is of a composition containing at least either cBN or wBN and one or two of Al and an oxide and a nitride of Al. The aforementioned sintered body has such a structure that Al or one or two of Al and an oxide and a nitride of Al whose mean layer thickness is 0.1 to 1 μm encloses at least either the aforementioned cBN or wBN.

In the high-pressure phase boron nitride-based sintered bodies described in the aforementioned Japanese Patent Laying-Open Gazette No. 58-58247, Japanese Patent Laying-Open Gazette No. 58-60678 and Japanese Patent Laying-Open Gazette No. 5-186844 high-pressure phase boron nitride grains of at least either cBN or wBN are coated with binders and sintered. Thus, the cBN grains in the sintered bodies aggregate thereby reducing regions being unsintered and improving wear resistance and chipping resistance.

Further, the sintered body described in Japanese Patent Laying-Open No. 58-61253 is such a one that Al enclosing at least either cBN or wBN counter-diffuses with and is strongly bonded to high-pressure phase boron nitride such as cBN and the oxide and the nitride of Al, thereby improving toughness of the aforementioned sintered body.

Grain growth of the binder phase has been a serious problem in the aforementioned generally proposed high-pressure phase boron nitride-based sintered bodies employing high-pressure phase boron nitride coated with the binders, not to mention the conventional high-pressure phase boron nitride-based sintered body. Namely, even if a high-pressure phase boron nitride-based sintered body having such a structure that high-pressure phase boron nitride grains homogeneously disperse in the aforementioned binder phase is prepared, there has been such a problem that the continuous binder phase causes conversion to coarse grains by grain-growing during sintering and chipping resistance lowers.

In the sintered bodies described in the aforementioned Japanese Patent Laying-Open Gazette No. 58-58247, Japanese Patent Laying-Open Gazette No. 58-60678 and Japanese Patent Laying-Open Gazette No. 5-186844, the binders containing elements such as Al, Ti and Hf coat the high-pressure phase boron nitride grains as at least one selected from nitrides, borides and solid solutions thereof. The aforementioned binders coat the high-pressure phase boron nitride grains as thermally and chemically stable ceramic, and hence bond strength formed between the high-pressure phase boron nitride grains and the grains of the transition metal nitride or the like and between the grains of the transition metal nitride or the like is weak as compared with the Al-based binder causing fused Al in a high-temperature state in sintering. Thus, these have been unsatisfactory in wear resistance and chipping resistance, following harshening of cutting conditions following recent requirement for efficiency increase-high-speeding.

In the sintered body described in the aforementioned Japanese Patent Laying-Open Gazette No. 58-61253, on the other hand, most part of Al remains as metallic Al in an unreacted state after sintering, and hence it has not been practical in such an application that the cutting temperature readily reaches a level exceeding 1000° C. in case of cutting hardened steel or cast iron or the like, since metallic Al is fused.

Further, the wBN grains employed in the aforementioned proposed sintered body are synthesized by an impact compression method, while cBN grains are synthesized by a static compression method. Both of wBN and cBN are high-pressure phase boron nitride, and various physical properties such as hardness, chemical stability and reactivity with the Al-based binder in the grains themselves are substantially equivalent. However, they remarkably differ from each other in existence forms of the grains thereof respectively. Namely, while the cBN grains mainly consist of single crystals, wBN is polycrystalline grains consisting of secondary grains in which primary grains having grain sizes of several 10 nm to several 100 nm are sintered by energy in impact compression. The grain sizes of these secondary grains of wBN reach about several μm.

Even if wBN is coated with the binder, therefore, it comes to that strong bonding through the grains of the transition metal nitride or the like is formed only between primary grains of wBN located on surfaces of the secondary grains of wBN and primary grains of wBN located on surfaces of other cBN grains or other secondary grains of wBN. Consequently, the primary grains of wBN are bonded to each other not through the binder in the interior of the secondary grains of wBN, and it could not be said that the same has sufficient wear resistance and chipping resistance.

The present invention has been proposed in order to solve the aforementioned problems, and aims at providing a high-pressure phase boron nitride-based high-hardness high-strength sintered body for cutting tools represented by a milling tool and an end mill and the like, which is improved in wear resistance and chipping resistance.

DISCLOSURE OF THE INVENTION

The high-pressure phase boron nitride-based sintered body according to the present invention comprises a plurality of grains of high-pressure phase boron nitride and a binder phase. The content of the aforementioned grains is at least 20.0 volume % and not more than 99.7 volume %. The aforementioned binder phase includes a first binder phase enclosing the aforementioned grains and a second binder phase other than that. The aforementioned first binder phase consists of the form of at least either a nitride of at least one of Ti, TiAl, Zr and Hf or a solid solution thereof. The aforementioned second binder phase includes a grain growth suppressive binder phase between a plurality of the aforementioned grains enclosed with the aforementioned first binder phase. The aforementioned grain growth suppressive binder phase consists of the form of at least either a boride of at least one of Ti, Zr and Hf or a solid solution thereof, or the form of at least either a nitride or a boride of Al or a solid solution thereof.

If the content of the grains of the high-pressure phase boron nitride is at least 20.0 volume % at this point, it is possible to prevent the thickness of the binder phase from thickening, thereby ensuring sufficient chipping resistance. If the content of the grains of the high-pressure phase boron nitride is not more than 99.7 volume %, further, it is possible to prevent the grains of the high-pressure phase boron nitride from breaking through the binder phase and being partially directly bonded to each other. Thus, sufficient wear resistance and chipping resistance can be attained. Further, the aforementioned second binder phase includes the grain growth suppressive binder phase between a plurality of the aforementioned grains enclosed with the aforementioned first binder phase, whereby grain growth in the aforementioned first and second binder phases can be suppressed. Thus, a homogeneous and fine binder phase can be obtained. Thus, sufficient chipping resistance can be ensured. Further, the aforementioned first binder phase is formed to enclose the aforementioned grains, whereby formation of neck growth by the aforementioned grains of the high-pressure phase boron nitride can be prevented. Thus, sufficient wear resistance and chipping resistance can be attained.

Further, it is preferable for the aforementioned high-pressure phase boron nitride-based sintered body that the mean thickness of the aforementioned first binder phase is at least 5 nm and not more than 3000 nm. If the mean thickness of the aforementioned first binder phase is at least 5 nm at this point, it is possible to prevent the grains of the high-pressure boron nitride from breaking through the aforementioned binder phase and being directly bonded to each other. Thus, sufficient chipping resistance can be attained. If the mean thickness of the aforementioned first binder phase is not more than 3000 nm, further, it is possible to prevent chipping resistance from lowering due to excess thickening of the thickness of the binder phase.

The high-pressure phase boron nitride-based sintered body according to the present invention comprises a plurality of grains of high-pressure phase boron nitride and a binder phase. The content of the aforementioned grains is at least 20.0 volume % and not more than 99.7 volume %. The aforementioned binder phase includes a first binder phase enclosing the aforementioned grains and a second binder phase other than that. The aforementioned first binder phase includes a third binder phase coming into contact with and enclosing the aforementioned grains and a fourth binder phase enclosing the aforementioned third binder phase. The aforementioned third binder phase consists of the form of at least either a nitride or a boride of at least one of Ti, Zr, Hf and Al or a solid solution thereof. The aforementioned fourth binder phase consists of the form of at least either a nitride, a carbide or an oxide of at least one of Ti, TiAl, Zr and Hf or a solid solution thereof. The aforementioned second binder phase includes a grain growth suppressive binder phase between a plurality of the aforementioned grains enclosed with the aforementioned first binder phase. The aforementioned grain growth suppressive binder phase consists of the form of at least either a boride of at least one of Ti, Zr and Hf or a solid solution thereof, or the form of at least either a nitride or a boride of Al or a solid solution thereof.

If the content of the grains of the high-pressure phase boron nitride is at least 20.0 volume %, it is possible to prevent the thickness of the binder phase from thickening, thereby ensuring sufficient chipping resistance. If the content of the grains of the high-pressure phase boron nitride is not more than 99.7 volume %, further, it is possible to prevent the grains of the high-pressure phase boron nitride from breaking through the binder phase and being partially directly bonded to each other. Thus, sufficient wear resistance and chipping resistance can be attained. Further, the aforementioned second binder phase includes the grain growth suppressive binder phase between a plurality of the aforementioned grains enclosed with the aforementioned first binder phase, whereby grain growth in the aforementioned first and second binder phases can be suppressed. Thus, a homogeneous and fine binder phase can be obtained. Thus, sufficient chipping resistance can be ensured. Further, the aforementioned first binder phase includes the third binder phase coming into contact with and enclosing the aforementioned grains and the fourth binder phase enclosing the aforementioned third binder phase, whereby formation of neck growth by the aforementioned grains of the high-pressure phase boron nitride can be prevented. Thus, sufficient wear resistance and chipping resistance can be attained.

In the aforementioned high-pressure phase boron nitride-based sintered body, further, it is preferable that the mean thickness of the aforementioned third binder phase is at least 5 nm and not more than 500 nm. Further, it is preferable that the mean thickness of the aforementioned fourth binder phase is at least 5 nm and not more than 3000 nm. If the mean thickness of the aforementioned third binder phase is at least 5 nm at this point, it is possible to prevent the grains of the high-pressure boron nitride from breaking through the binder phase and being directly bonded to each other. Thus, sufficient chipping resistance can be ensured. If the mean thickness of the aforementioned third binder phase is not more than 500 nm, further, it is possible to prevent deterioration of chipping resistance caused by thickening of the binder phase, while the binder phase can be further refined and sufficient chipping resistance can be ensured.

In the aforementioned high-pressure phase boron nitride-based sintered body, further, it is preferable that the aforementioned binder phase contains an Al compound reactively formed during sintering with at least one of an Al metal, TiAlN or an intermetallic compound containing an Al element serving as a starting material. At this point, the aforementioned binder phase has at least one of an Al metal, TiAlN or an intermetallic compound containing an Al element, whereby reactive products forming strong bonding can be formed between the grains of the high-pressure phase boron nitride and a nitride of Ti or the like contained in the aforementioned binder phase and in the nitride of Ti contained in the aforementioned binder phase or the like. Thus, sufficient wear resistance can be attained.

Further, the Al metal, TiAlN and the intermetallic compound containing an Al element are extremely active, and hence the same may readily react with an oxygen component and moisture adsorbed in the high-pressure phase boron nitride and powder of the remaining binder to form $Al_2O_3$ or the like. The aforementioned oxygen component and moisture are sintering inhibitive factors. Therefore, these oxygen component and the like are removed from the aforementioned high-pressure phase boron nitride and the powder of the remaining binder by becoming $Al_2O_3$ or the like, whereby the sintering property improves and stronger bonding can be formed. While $Al_2O_3$ has small heat conductivity and hence formation thereof is originally unpreferable, the heat conductivity of the sintered body does not remarkably lower if a nitride, a carbide or a boride of at least one selected from Ti, Zr, Hf and Al having large heat conductivity or a solid solution thereof is the main (at least 50 volume %) of the binder phase. Therefore, it does not exert remarkable influence on the cutting performance of the sintered body.

In the aforementioned high-pressure phase boron nitride-based sintered body, further, it is preferable that the content of a binder phase part consisting of the aforementioned Al compound is at least 0.1 volume % and less than 30.0 volume %. If the content of the aforementioned binder phase part is at least 0.1 volume %, bond strength between the grains of the high-pressure phase boron nitride and the components forming the binder phase and between the components forming the binder phase can be sufficiently ensured, while the grain growth suppressive binder phase can be sufficiently formed at the same time. Thus, chipping resistance and wear resistance can be prevented from lowering. If the content of the aforementioned binder phase part is less than 30.0 volume %, it is possible to prevent occurrence of such a problem that wear resistance of the high-pressure phase boron nitride-based sintered body lowers due to influence by the aforementioned binder phase part which is inferior in wear resistance as compared with the high-pressure phase boron nitride, a nitride, a carbide or an oxide of Ti, TiAl, Zr or Hf or a solid solution thereof.

Further, it is preferable that the aforementioned high-pressure phase boron nitride-based sintered body further comprises unavoidable impurities and a residual binder phase other than the aforementioned Al compound, and the content of the aforementioned unavoidable impurities is not more than 5.0 volume %.

In the aforementioned high-pressure phase boron nitride-based sintered body, further, it is preferable that transverse rupture strength measured at a 4 mm span with a test piece of 6 mm in length, 3 mm in width and at least 0.4 mm and not more than 0.45 mm in thickness is at least 120 kgf/mm$^2$.

In the aforementioned high-pressure phase boron nitride-based sintered body, further, it is preferable that, in a region containing at least 100 grains of the high-pressure phase boron nitride, the ratio of the number of grains which are in contact with the remaining aforementioned grains is at least 0.1% and less than 20.0%. At this point, the aforementioned sintered body in which the ratio of the number of the aforementioned grains which are in contact with the remaining grains of the high-pressure phase boron nitride is at least 0.1% and less than 20.0% is particularly homogeneous in structure, and excellent in wear resistance and chipping resistance.

In case of performing dissolution treatment with fluonitric acid, at least more than 90% of the remaining grains of the high-pressure phase boron nitride exist as single grains in the aforementioned high-pressure phase boron nitride-based sintered body. In the aforementioned dissolution treatment, the aforementioned sintered body which is brought into the form of such a quadrilateral that one side is at least 3 mm and not more than 7 mm and the thickness is at least 0.3 mm and not more than 0.5 mm is employed. The aforementioned sintered body is subjected to dissolution treatment of at least 3 hours and not more than 5 hours in a closed vessel with fluonitric acid under at least 120° C. and not more than 150° C. The aforementioned fluonitric acid is prepared by mixing 40 ml of that prepared by doubly diluting at least 60.0 weight % and not more than 65.0 weight % of nitric acid and 10 ml of hydrofluoric acid of at least 45.0 weight % and not more than 50.0 weight % with each other. The sintered body in which at least more than 90% of the remaining aforementioned grains exist as single grains has such a structure that bonding between the grains of the aforementioned high-pressure phase boron nitride is hardly present but the grains of the high-pressure phase boron nitride homogeneously disperse in the aforementioned binder phase. Therefore, it is superior in wear resistance and chipping resistance as compared with the conventional high-pressure phase boron nitride-based sintered body.

In the aforementioned high-pressure phase boron nitride-based sintered body, further, it is preferable that the aforementioned high-pressure phase boron nitride is cubic born nitride. In an X-ray diffraction pattern, further, it is preferable that the half-power band width of the maximum strength line among diffraction lines of a component which is decidable as the main in the aforementioned binder phase is at least 1.4 times the half-power band width of a (111) diffraction line of the aforementioned cubic born nitride. At this point, conditions of 40 keV, 25 mA, Cu, 2θ=20 to 80° and a scanning rate of 0.1°/second are employed for the aforementioned X-ray diffraction. Such an aforementioned high-pressure phase boron nitride-based sintered body has a particularly fine and homogeneous structure. Therefore, it is excellent in hardness and strength, and exhibits excellent wear resistance and chipping resistance in cutting of a high-hardness uncuttable material such as hardened steel or cast iron.

In the aforementioned high-pressure phase boron nitride-based sintered body, further, it is preferable that the mean grain size of the grains of the aforementioned high-pressure phase boron nitride is not more than 3 μm. If the mean grain size of the aforementioned grains is thus not more than 3 μm at this point, it exhibits more excellent wear resistance and chipping resistance. Further, it is preferable that transverse rupture strength measured at a 4 mm span with a test piece of 6 mm in length, 3 mm in width and at least 0.4 mm and not more than 0.45 mm in thickness is at least 140 kgf/mm$^2$. At this point, such an aforementioned high-pressure phase boron nitride-based sintered body exhibits particularly excellent chipping resistance in cutting of a high-hardness uncuttable material.

Further, it is preferable that the aforementioned high-pressure phase boron nitride-based sintered body further comprises unavoidable impurities, a binder phase part consisting of an Al compound, and a remaining binder phase other than the said Al compound. Further, it is preferable that the aforementioned high-pressure phase boron nitride is cubic boron nitride. Further, it is preferable that the aforementioned binder phase part consists of an Al compound reactively formed during sintering with at least one of Al, TiAl, Ti$_2$AlN, Ti$_3$Al and TiAl$_3$ serving as a starting material, the aforementioned first binder phase consists of at least one of nitrides of Ti or TiAl, the content of the aforementioned grains is at least 45.0 volume % and not more than 75.0 volume %, the content of the aforementioned unavoidable impurities is not more than 3.0 volume %, and the mean thickness of the aforementioned first binder phase is at least 5 nm and not more than 500 nm.

Further, it is preferable that the aforementioned high-pressure phase boron nitride-based sintered body further comprises unavoidable impurities, a binder phase part consisting of an Al compound, and a remaining binder phase other than the said Al compound, and the aforementioned high-pressure phase boron nitride is cubic boron nitride. Further, it is preferable that the aforementioned binder phase part consists of an Al compound reactively formed during sintering with at least one of Al, TiAl, Ti$_2$AlN, Ti$_3$Al and TiAl$_3$ as a starting material, the aforementioned third binder phase consists of the form of at least either a nitride or a boride of at least one of Ti and Al and a solid solution thereof, and the aforementioned fourth binder phase consists of the form of at least 1 any of a nitride, a carbide and an oxide of at least one of Ti, TiAl, Zr and Hf and solid solutions thereof. Further, it is preferable that the content of the grains of the aforementioned cubic boron nitride is at least 45.0 volume % and not more than 75.0 volume %, the content of the aforementioned binder phase is at least 1.0 volume % and not more than 20.0 volume %, the content of the aforementioned unavoidable impurities is not more than 3.0 volume %, the mean thickness of the aforementioned third binder phase is at least 5 nm and not more than 200 nm, and the mean thickness of the aforementioned fourth binder phase is at least 5 nm and not more than 500 nm.

BEST MODES FOR CARRYING OUT THE INVENTION

Figure 1:
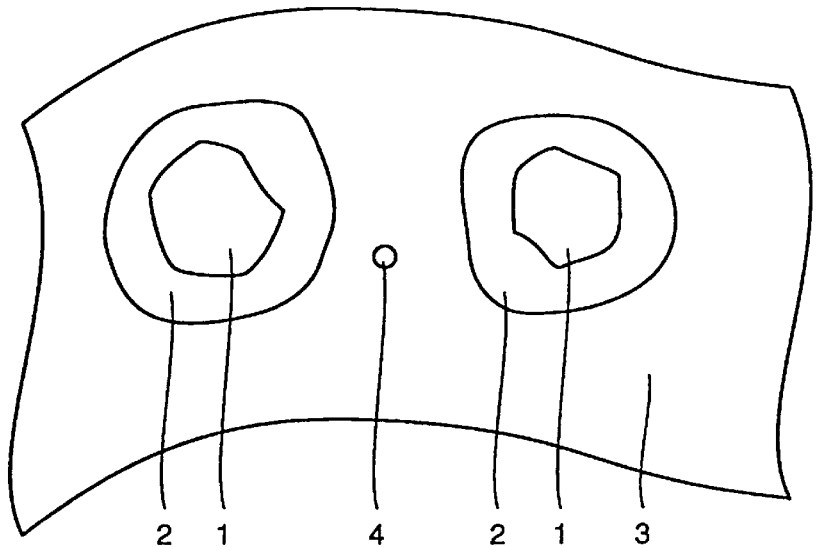
FIG. 1 is a model diagram of the structure of a high-pressure phase boron nitride-based sintered body prepared in accordance with Example of the present invention.

The high-pressure phase boron nitride-based sintered body according to the present invention can be obtained in the following procedure:

First, a mixing-crushing apparatus such as a planetary mill which is further excellent in mixing property and crushability is used. Mixed powder in which high-pressure phase boron nitride grains and a binder homogeneously disperse can be obtained by optimizing mixing-crushing conditions such as a medium, a dispersing agent, a treating time and the like in mixing.

Further, grains of high-pressure phase boron nitride previously coated with a binder by a chemical vapor deposition method (CVD method) or a physical vapor deposition method (PVD method), or an electroless plating method or a method utilizing mechanochemical reaction induced by compressive shearing force, frictional force or impactive force in mechanical mixing may be employed. These grains of the high-pressure phase boron nitride coated with the binder and the binder may be mechanically mixed with each other.

By such means, the grains of the high-pressure phase boron nitride, an Al-based binder and grains of a nitride or a carbide of at least one selected from Ti, TiAl, Zr, Hf and Al or a solid solution thereof (hereinafter referred to as a nitride of Ti or the like) are brought into an ideal arrangement state.

A conventional plasma sintering apparatus, a hot press apparatus, a very high pressure sintering apparatus or the like is employed for a sintering step. Thus, occurrence of neck growth between the grains of the high-pressure phase boron nitride is prevented, and reaction products forming strong bonding between the grains of the aforementioned high-pressure phase boron nitride and the grains of the nitride of Ti or the like and between the grains of the nitride of Ti or the like are selectively formed. For example, TiN and AlB$_2$ or the like are formed by reaction of cBN and TiAl. Further, TiAlN or the like is formed by reaction of TiN and TiAl. Further, the high-pressure boron nitride-based sintered body of the present invention having such a structure that the grains of the aforementioned high-pressure phase boron nitride homogeneously disperse in the aforementioned binder phase can be obtained. Further, a grain growth suppressive binder phase consisting of the form of at least either a nitride or a boride of Al or a solid solution thereof, or the form of at least either a boride of at least one of Ti, TiAl, Zr and Hf or a solid solution thereof can be formed in the binder phase.

Concrete execution methods of the present invention are now described with reference to Examples.

EXAMPLE 1

Dry mixing of cBN powder whose mean grain size was 10 µm and powder of an Al metal or an intermetallic compound of at least one of Al elements was performed with a specific vacuum furnace storing a rotary mixing apparatus therein under conditions of $10^{-4}$ Torr, 300° C. and 2000 rpm.

After recovering this mixed powder, a surface of the aforementioned powder was observed with an EPMA (Electron Probe Micro Analyser), to find that the cBN powder and various types of binders were homogeneously coated with various types of intermetallic compounds.

Then, this cBN powder and the various types of binders coated with the binders were sintered for 10 minutes with a belted very high pressure apparatus under conditions of 4 GPa and 1480° C. For the purpose of comparison, cBN-based sintered bodies employing starting materials of the same compositions prepared by performing wet mixing with a pot of cemented carbide and Teflon balls of 10 mm in diameter at 250 rpm for 3600 minutes in ethyl alcohol were also prepared.

After sintering, capsules of Mo were recovered and thereafter removed by grinding, and analysis was made on the structures and compositions of these sintered bodies with an ICP-AES (Inductive Coupled Plasma Atomic Emission Spectrometer) and a TEM (Transmission Electron Microscope) and by AES (Auger Electron Spectroscopy). While no Al$_2$O$_3$ was added as a starting material for cBN-based sintered bodies prepared in this Example, Al$_2$O$_3$ appearing to have been formed by reacting with oxygen components and moisture which were sintering inhibitive factors adsorbed by the sintering material powder in the sintering process was formed by 10% in weight % at the maximum. Table 1 shows the details of the prepared sintered bodies. For the purpose of comparison, evaluation was made also as to cBN-based sintered bodies employing cBN powder coated with binders consisting of ceramic components such as AlB$_2$ and a commercially available cBN-based sintered body for cutting hardened steel.

TABLE 1

| Sample No. | Starting Material Component of Coating Binder | Components of Various Binders other than Coating Binder | Sintered Body Volume Percentage of cBN Grains (%) | Volume Percentage of Al Compound (%) | Firsts Binder Phase Third Binder Phase and Mean Thickness (nm) | Fourth Binder Phase and Mean Thickness (nm) | Grain Growth Suppressive Binder Phase | Classification |
|---|---|---|---|---|---|---|---|---|
| 1 | Al | TiN | 60 | 16 | AlN, AlB$_2$ 65 | TiN 350 | AlN, AlB$_2$, TiB$_2$ | Example |
| 2 | Ti$_3$Al | TiN | 60 | 16 | TiN 410 | — | AlB$_2$, AlN, TiB$_2$ | Example |
| 3 | Ti$_3$Al | TiN | 60 | 24 | TiN 390 | — | AlB$_2$, AlN, TiB$_2$ | Example |
| 4 | Ti$_3$Al | TiN | 60 | 30 | TiN 360 | — | AlB$_2$, AlN, TiB$_2$ | Example |
| 5 | Ti$_3$Al | TiN | 15 | 30 | TiN 3800 | — | AlB$_2$, AlN, TiB$_2$ | Comparative Example |
| 6 | Ti$_3$Al | TiN | 25 | 26 | TiN 2500 | — | AlB$_2$, AlN, TiB$_2$ | Example |
| 7 | Ti$_3$Al | TiN | 99.5 | 0.1 | TiN 10 | — | AlB$_2$, AlN, TiB$_2$ | Example |
| 8 | Ti$_3$Al | TiN | 99.9 | 0.01 | cBN grains partially directly bounded | | | Comparative Example |
| 9 | Ti$_2$AlN | TiN | 60 | 14 | TiN 370 | — | AlB$_2$, AlN, TiB$_2$ | Example |
| 10 | TiAl | TiN | 60 | 19 | TiN, TiAlN 500 | — | AlB$_2$, AlN, TiB$_2$ | Example |
| 11 | TiAl$_3$ | TiN | 60 | 15 | AlN, AlB$_2$ 50 | TiN 300 | AlB$_2$, AlN, TiB$_2$ | Example |
| 12 | Hf$_3$Al | HfN | 60 | 16 | HfN 400 | — | AlB$_2$, AlN, TiB$_2$ | Example |
| 13 | Zr$_3$Al | ZrN | 60 | 16 | ZrN 400 | — | AlB$_2$, AlN, ZrB$_2$ | Example |
| 14 | AlB$_2$ | TiN | 60 | 15 | 380 | — | | Comparative Example |
| 15 | TiB$_2$ | TiN | 60 | — | 350 | — | | Comparative Example |
| 16 | AlN | TiN | 60 | 18 | 420 | — | | Comparative Example |
| 17 | — | — | 60 | 15 | structure in which TiN, TiB$_2$, AlN and AlB$_2$ segregate | | | Comparative Example |

FIG. 1 shows the structure of such a sintered body that first binder phases are formed around cBN grains as the sample No. 2 or the like. Referring to FIG. 1, first binder phases 2 are formed around cBN grains 1. A grain growth suppressive binder phase 4 is formed in a second binder phase 3 between the cBN grains 1. A region in the second binder phase 3 other than the grain growth suppressive binder phase 4 contains unavoidable impurities such as Al$_2$O$_3$.

Figure 2:
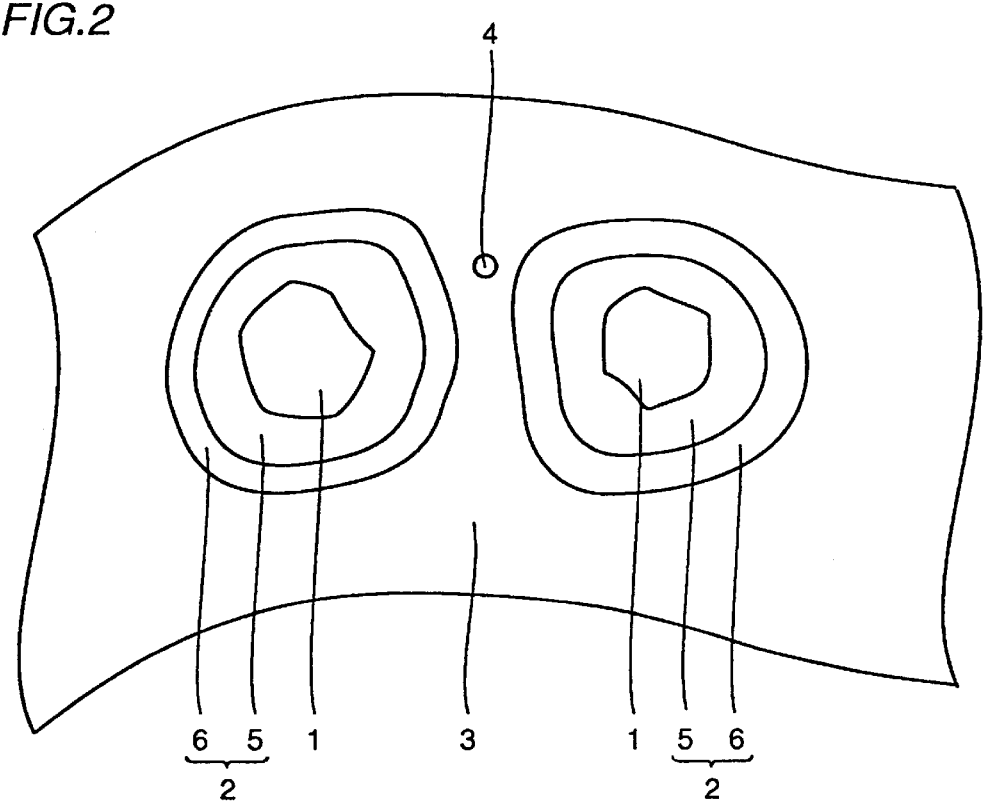
FIG. 2 is a model diagram of the structure of a high-pressure phase boron nitride-based sintered body prepared in accordance with Example of the present invention.

FIG. 2 shows such a state that third and fourth binder phases are formed around cBN grains as the sample No. 1 or the like. Referring to FIG. 2, the structure of the sintered body prepared in accordance with Example of the present invention basically comprises the same structure as the structure of the sintered body shown in FIG. 1, while first binder phases 2 include the aforementioned third binder phases 5 and the aforementioned fourth binder phases 6. Concretely, the third binder phases 5 are formed around cBN grains 1, and the aforementioned fourth binder phases 6 are formed around the aforementioned third binder phases 5.

Measurement test pieces of 6 mm in length, 3 mm in width and 0.4 to 0.45 mm in thickness were cut out from these sintered bodies, and transverse rupture strength was measured under a condition of a 4 mm span. Further, sintered body tips (ISO standard: SNMG120808) for cutting whose major surface shapes were quadrilateral shapes were formed and a cutting test was performed under the following conditions:

Cutting Speed: V 70 m/min., Depth of Cut: 1 mm, Feed Rate 0.2 mm/rev., 30 minutes in a wet type Table 2 shows the results of this cutting test.

TABLE 2

| Sample No. | Transverse Rupture Strength (kgf/mm$^2$) | Flank Wear Width in 1 km Cutting (mm) | Cutting Distance up to Chipping (km) | Classification |
|---|---|---|---|---|
| 1 | 125 | 0.065 | 4.7 | Example |
| 2 | 130 | 0.062 | 4.8 | Example |
| 3 | 135 | 0.068 | 4.6 | Example |
| 4 | 135 | 0.078 | 3.2 | Example |
| 5 | 70 | 0.060 | 1.5 | Comparative Example |
| 6 | 120 | 0.061 | 4.0 | Example |
| 7 | 130 | 0.088 | 4.3 | Example |
| 8 | 85 | 0.012 | 1.9 | Comparative Example |
| 9 | 130 | 0.063 | 4.6 | Example |
| 10 | 125 | 0.064 | 4.7 | Example |
| 11 | 130 | 0.062 | 4.7 | Example |
| 12 | 130 | 0.061 | 4.2 | Example |
| 13 | 125 | 0.066 | 4.0 | Example |
| 14 | 115 | 0.080 | 2.6 | Comparative Example |
| 15 | 115 | 0.079 | 2.7 | Comparative Example |
| 16 | 115 | 0.088 | 2.6 | Comparative Example |
| 17 | 110 | 0.075 | 3.1 | Comparative Example |

Referring to Tables 1 and 2, chipping resistance lowers if the content of cBN lowers as in the sample No. 5, since the thickness of the binder phase thickens. When the content of cBN increases, chipping resistance lowers likewise since grains of cBN are partially directly bonded to each other while breaking through the binder phase, as shown in the sample No. 8. It is understood that samples formed by the cBN-based sintered bodies according to the present invention exhibit excellent chipping resistance.

Also as to wear resistance, it is understood that the cBN-based sintered bodies according to the present invention have excellent wear resistance. Further, the cBN-based sintered bodies according to the present invention exhibit superior cutting performance to cBN-based sintered bodies employing cBN powder coated with binders consisting of ceramic components such as $AlB_2$ as shown in samples Nos. 14 to 16, when observing cutting distances up to chipping with reference to Table 2. In particular, the cBN-based sintered bodies according to the present invention employing cBN powder coated with Al and intermetallic compounds of Ti and Al.

EXAMPLE 2

Three types of binder-coated cBN powder materials shown below were prepared with a vacuum vapor deposition apparatus storing an ultrasonic vibrator therein.

Sample A: That prepared by coating cBN powder of 2 μm and 4 μm in mean grain size with $TiN_{0.8}$ under conditions of $10^{-4}$ Torr, 300° C. and 60 minutes, and further performing coating of $TiAl_3$ under conditions of $10^{-4}$ Torr, 300° C. and 5 minutes.

Sample B: That prepared by coating cBN powder of 4 μm in mean grain size with $TiN_{0.8}$ under conditions of $10^{-4}$ Torr, 300° C. and 60 minutes, and further performing coating of $TiAl_3$ under conditions of $10^{-4}$ Torr, 300° C. and 5 minutes.

Sample C: That prepared by coating cBN powder of 2 μm in mean grain size with only $TiN_{0.8}$ under conditions of $10^{-4}$ Torr, 300° C. and 60 minutes.

Powder surfaces after the aforementioned coating treatment were observed with an EPMA, to find that the binders completely coated and homogeneously coated the cBN powder surfaces. Then, the binder-coated cBN powder materials of the samples A and B coated with these binders were charged in capsules of Mo and thereafter sintered with a belted very high pressure apparatus under conditions of 5.0 GPa and 1400° C. for 5 minutes. For the purpose of comparison, samples were prepared also as to two types of cBN-based sintered bodies shown below.

Comparative Sample 1: A cBN-based sintered body employing the binder-coated cBN powder of the aforementioned sample C subjected to wet mixing in ethyl alcohol with a cemented-carbidic pot and Teflon balls of 10 mm in diameter at 250 rpm for 3600 minutes and $TiAl_3$ powder of 0.5 μm in mean grain size as starting materials, which is of the same composition as the cBN-based sintered bodies employing the aforementioned samples A and B as starting materials.

Comparative Sample 2: A cBN-based sintered body employing cBN powder of 2 μm in mean grain size subjected to wet mixing in ethyl alcohol with a cemented-carbidic pot and Teflon balls of 10 mm in diameter at 250 rpm for 3600 minutes, $TiAl_3$ powder of 0.5 μm in mean grain size and $TiN_{0.8}$ powder of 0.5 μm in mean grain size as starting materials, which is of the same composition as the cBN-based sintered bodies employing the aforementioned samples A and B as starting materials.

After sintering, the capsules of Mo were recovered and thereafter removed by grinding, and these sintered bodies were analyzed by X-ray diffraction and ICP-AES, for investigating the compositions thereof. Further, contact rates of the cBN grains were measured from surface analysis images thereof by FE-AES (Field Emission type Auger Electron Spectroscopy). Further, measurement test pieces of 6 mm in length, 3 mm in width and 0.5 to 0.55 mm in thickness were cut out from these sintered bodies, and transverse rupture strength was measured under a condition of a 4 mm span. Table 3 shows the details of the prepared sintered bodies.

TABLE 3

| | Starting Material | | Sintered Body | | | | |
|---|---|---|---|---|---|---|---|
| | | | | First Binder Phase | | | |
| Sample No. | Component of Coating Binder | Components of Various Binders other than Coating Binder | Mean Grain Size (μm) and Volume Percentage (%) of cBN Grains | Third Binder Phase and Mean Thickness (nm) | Fourth Binder Phase and Mean Thickness (nm) | Grain Growth Suppressive Binder Phase | Classification |
| 1 | $TiN_{0.8}$ $TiAl_3$ | — — | 2 40 | $TiB_2$, AlN 160 | TiN 400 | AlN, $AlB_2$, $TiB_2$ | Example |
| 2 | $TiN_{0.8}$ $TiAl_3$ | — — | 2 50 | $TiB_2$, AlN 170 | TiN 150 | $AlB_2$, AlN, $TiB_2$ | Example |
| 3 | $TiN_{0.8}$ $TiAl_3$ | — — | 2 70 | $TiB_2$, AlN 10 | TiN 25 | $AlB_2$, AlN, $TiB_2$ | Example |
| 4 | $TiN_{0.8}$ $TiAl_3$ | — — | 2 80 | $TiB_2$, AlN 5 | TiN 10 | $AlB_2$, AlN, $TiB_2$ | Example |
| 5 | $TiN_{0.8}$ $TiAl_3$ | — — | 4 70 | $TiB_2$, AlN 10 | TiN 30 | $AlB_2$, AlN, $TiB_2$ | Example |
| 6 | $TiN_{0.8}$ | $TiAl_3$ | 2 50 | $TiB_2$ 170 | TiN 150 | $AlB_2$, AlN, $TiB_2$ | Comparative Example |
| 7 | — | $TiN_{0.8}$, $TiAl_3$ | 2 70 | not densified, unsinterable | | | Comparative Example |
| 8 | — | — | 4 68 | Structure in which TiN, $TiB_2$, AlN and $AlB_2$ segregate | | | Comparative Example |

Further, sintered body tips (ISO standard: SNMG20808) for cutting whose major surface shapes were quadrilateral were formed and a cutting test was performed under the following conditions:

Workpiece: Round bar of a cemented hardened steel material of an SGR420H material of HRC59 in hardness having V-shaped grooves in six portions of its outer periphery Cutting Speed: V 170 m/min., Depth of Cut: 0.2 mm, Feed Rate: 0.1 mm/rev., wet type For the purpose of comparison, similar evaluation was made also on a commercially available cBN-based sintered body for intermittently cutting hardened steel. Table 4 shows the results of the cutting test.

TABLE 4

| Sample No. | Half-Power Band Width of TiN(220)Diffraction Line/Half-Power Band Width of cBN(111) Diffraction Line | Contact Rate of cBN (%) | Transverse Rupture Strength (kgf/mm$^2$) | Flank Wear Width with 50000 Impacts (mm) | Classification |
|---|---|---|---|---|---|
| 1 | 1.4 | 0.2 | 135 | chipped with 47000 impacts | Example |
| 2 | 1.4 | 3 | 145 | 0.134 | Example |
| 3 | 1.5 | 16 | 150 | 0.135 | Example |
| 4 | 1.4 | 19 | 135 | chipped with 49000 impacts | Example |
| 5 | 1.4 | 16 | 135 | chipped with 40000 impacts | Example |
| 6 | 1.3 | 23 | 130 | chipped with 39000 impacts | Comparative Example |
| 7 | — | — | — | — | Comparative Example |
| 8 | 1.1 | 70 | 115 | chipped with 27000 impacts | Comparative Example |

The sample No. 8 is the commercially available cBN-based sintered body for intermittently cutting hardened steel. The samples Nos. 6 and 7 are cBN-based sintered bodies for comparison, the sample No. 6 is the cBN-based sintered body of comparative sample 1, and the sample No. 7 is the cBN-based sintered body of comparative sample 2. Referring to Table 4, the cBN-based sintered bodies according to the present invention exhibit excellent transverse rupture strength. Further, the cBN-based sintered bodies of the present invention in this Example 2 exhibit superior transverse rupture strength to the cBN-based sintered bodies of the present invention shown in Example 1.

Although the cBN-based sintered body of the sample No. 6 is of the same composition as the sample No. 2, the contact rate of the cBN grains of the sample No. 6 is 23% while the contact rate of the cBN grains of the sample No. 2 is 3%. This is because the structure of the sample No. 6 was slightly heterogeneous since the mixing methods for the cBN powder and the binder powder were different. As understood from Table 4, the cBN-based sintered bodies of the present invention in which the contact rates of the cBN grains are at least 0.1% and less than 20% are particularly homogeneous in structure and excellent in chipping resistance. Further, the samples Nos. 1 to 5, in which the binder phases (TiN) exhibit large half-power band widths as compared with cBN in X-ray diffraction patterns, have fine binder phases in particular, and are excellent in chipping resistance.

EXAMPLE 3

Mixed powder of cBN powder whose mean grain size was 1 μm, wBN powder whose secondary grains were 2 μm in mean grain size, Ti$_3$Al powder whose mean grain size was 5 μm and TiN$_{0.7}$ powder whose mean grain size was 3 μm was blended in the ratios 45:10:20:25 in volume %, and wet mixing·crushing was performed in a mixed solution of ethyl alcohol and polyethylene glycol with a planetary mill apparatus employing a pot of cemented carbide and carbide balls of 10 mm in diameter at 250 rpm for 60 to 300 minutes.

After recovering this mixed·crushed powder, SEM (Scanning Electron Microscope) observation was performed, to find that the mean grain size of this mixed·crushed powder was not more than about 0.5 μm and most of wBN grains having formed secondary grains before mixing·crushing existed as primary grains.

Then, this mixed powder was sintered with a belted very high pressure apparatus under conditions of 4 GPa and 1480° C. for 10 minutes. For the purpose of comparison, samples were prepared also as to high-pressure phase boron nitride-based sintered bodies employing starting materials of the same composition formed by performing mixing in a mixed solution of ethyl alcohol and polyethylene glycol with a conventional ball mill apparatus employing a pot of cemented carbide and carbide balls of 10 mm in diameter at 250 rpm for 3600 minutes. After sintering, capsules of Mo were recovered and thereafter the capsules were removed by grinding, and analysis was performed on these sintered bodies by X-ray diffraction, with a TEM and by AES, for analyzing the compositions and structures of these sintered bodies.

Then, these sintered bodies were brought into the form of quadrilaterals whose single sides were 5 mm and thicknesses were 0.4 mm, and held at 140° C. for 3 hours in a closed vessel of Teflon with fluonitric acid prepared by mixing 40 ml of that obtained by doubly diluting nitric acid of 1.38 in specific gravity and 61% in weight % and 10 ml of hydrofluoric acid of 1.147 in specific gravity and 47% in weight %, thereby performing dissolution treatment of binder components. Thereafter ultrasonic cleaning with distilled water or the like was repeated, and cBN and wBN were recovered. The ratios of cBN and wBN existing as single grains were obtained with a TEM. Table 5 shows the details of the prepared sintered bodies.

TABLE 5

| Mixing-Crushing Method | Starting Material Mean Grain Size (μm) of Mixed-Crushed Powder | Observed Representative Structure — Sintered Body | | | | Ratio (%) of Single Grains after Dissolution Treatment |
|---|---|---|---|---|---|---|
| | | First Binder Phase | | | | |
| | | | Third Binder Phase and Mean Thickness (nm) | Fourth Binder Phase and Mean Thickness (nm) | Grain Growth Suppressive Binder Phase | |
| planetary mill 60 min. | ~4 | structure in which TiN, TiB$_2$, AlN and AlB$_2$ segregate | | | | 68 |
| planetary mill 120 min. | ~1.2 | 1 | structure in which TiN, TiB$_2$, AlN and AlB$_2$ segregate | | | 85 |
| | | 2 | TiN 90 | — | TiB$_2$ | |
| | | 3 | AlB$_2$ 20 | TiN 90 | — | |
| planetary mill 300 min. | ~0.5 | 1 | TiN 50 | — | AlN, TiB$_2$ | 91 |
| | | 2 | AlN 40 | — | TiB$_2$, AlB$_2$ | |
| | | 3 | AlN 10 | TiN 50 | TiB$_2$, AlB$_2$, AlN | |
| | | 4 | AlB$_2$ 7 | TiN 30 | TiB$_2$, AlB$_2$, AlN | |
| | | 5 | TiB$_2$ 15 | TiN 20 | TiB$_2$, AlB$_2$, AlN | |
| conventional ball mill 180 min. | ~2 | structure in which TiN, TiB$_2$, AlN, AlB$_2$ segregate, partially unsintered | | | | 40 |
| conventional ball mill 2400 min. | ~0.8 | structure in which TiN, TiB$_2$, AlN and AlB$_2$ segregate | | | | 65 |

Preparation test pieces of 6 mm in length, 3 mm in width and 0.4 to 0.45 mm in thickness were cut out from these sintered bodies, and transverse rupture strength was measured under a condition of a 4 mm span. Measurement was made also as to fracture toughness. Further, sintered body tips (ISO standard: SNMG120808) for cutting whose major surface shapes were quadrilateral were formed and a cutting test was performed under the following conditions:

Workpiece: Round bar of an SKH51 material of HRC60 in hardness

Cutting Speed: V 70 m/min., Depth of Cut: 1 mm, Feed Rate: 0.2 mm/rev., 30 minutes in a wet type Table 6 shows the results of these tests.

TABLE 6

| Mixing Crushing Method | Fracture Toughness Value (Mpam$^{3/2}$) | Transverse Rupture Strength (kgf/mm$^2$) | Flank Wear Width (mm) |
|---|---|---|---|
| Planetary Mill 60 min. | 5.8 | 100 | 0.140 |
| Planetary Mill 120 min. | 6.7 | 115 | 0.124 |
| Planetary Mill 180 min. | 7.8 | 125 | 0.106 |
| Conventional Ball Mill 180 min. | 9.8 | 60 | chipped in 19 minutes flank wear width in chipping: 0.25 |
| Conventional Ball Mill 2400 min. | 5.9 | 110 | 0.133 |
| Commercially Available cBN Sintered Body for Cutting Hardened Steel | 5.8 | 105 | 0.141 |

While evaluation with the fracture toughness values was attempted as an evaluation method for chipping resistance of the high-pressure phase boron nitride-based sintered bodies, it did not correspond to actual cutting evaluation, and it was proved that correlation holds between transverse rupture strength and cuttability in the sintered bodies of the present invention although cracking was hard to propagate but fracture toughness values increased particularly in sintered bodies having unsintered portions.

EXAMPLE 4 cBN powder composite-coated with a binder was prepared by the following steps:

Step 1

With an RF sputtering PVD apparatus, cBN powder whose mean grain size was 10 μm was coated with TiAl. At this time, a degree of vacuum in a furnace was set at 10$^{-4}$ Torr, and thereafter held in an atmosphere of 10$^{-2}$ Torr by introducing Ar gas. Coating was made under conditions of 5 KW in power, 15 MHz in frequency and 5 hours while heating a powder vessel up to 200°.

Step 2: Then, this binder-coated cBN powder and grain growth suppressive binder powder of any of AlN, TiB$_2$, HfB$_2$, WC and ZrO$_2$ whose mean grain size was 0.1 μm were blended in the ratio 92:8 to 88:12, and dry mixing was performed with a specific vacuum furnace apparatus storing a rotary mixing apparatus similar to that in the aforementioned Example 1 therein. As to conditions at this time, the degree of vacuum in the furnace was set at 10$^{-4}$ Torr and thereafter held in an atmosphere of 10$^{-2}$ Torr while introducing N$_2$ gas at the rate of 200 cc/min. Mixing was performed under a condition of 2000 rpm while heating the interior of the furnace up to 200° C.

Figure 3:
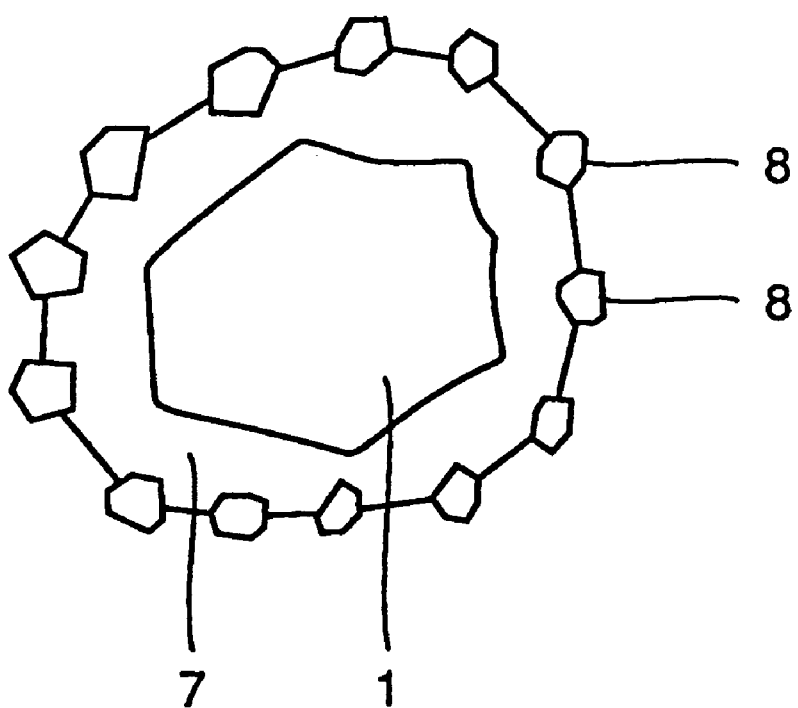
FIG. 3 is a model diagram of a binder-coated cubic boron nitride grain prepared in accordance with Example of the present invention.

When analysis was made with an SEM and a TEM and by FE-AES and X-ray diffraction analysis after recovering this mixed powder, the cBN powder was homogeneously coated with cubic type TiAlN, and moreover, grains of AlN and the like bit into surfaces of the TiAlN layers. FIG. 3 shows a sectional model diagram of this binder-coated cBN grain. Referring to FIG. 3, a TiAlN layer 7 is formed around a cBN grain 1. Grains 8 of AlN and the like bite into a surface of the TiAlN layer 7.

Then, this binder-coated cBN powder was employed as a starting material for preparing cBN-based sintered bodies similarly to the aforementioned Example 1, and the compositions and structures were analyzed.

As samples for comparison, evaluation was made also as to two samples of:

Sample 1 for Comparison: A cBN-based sintered body employing TiAlN (cubic type)-coated cBN powder prepared by performing only nitriding on the binder-coated cBN powder of the step 1; and Sample 2 for Comparison: A cBN-based sintered body of the same composition prepared by performing wet mixing with a pot of cemented carbide and Teflon balls of 10 mm in diameter by employing cBN, TiN and TiAl of 2 μm in mean grain size as starting materials under conditions of 250 rpm, 3600 minutes and in ethyl alcohol. Table 7 shows detailed data of these prepared sintered bodies.

The sample No. 5 is a cBN-based sintered body of the present invention employing TiAlN-coated cBN grains prepared by performing only nitriding on binder-coated cBN grains of the step 1. The sample No. 6 is a cBN-based sintered body for comparison employing binder-coated cBN grains of the step 2 containing WC as a grain growth suppressive binder phase. The sample No. 7 is a cBN-based sintered body for comparison employing binder-coated cBN grains of the step 2 containing $ZrO_2$ as a grain growth suppressive binder phase. And, the sample No. 8 is a cBN-based sintered body by the comparative sample 2.

Further, transverse rupture strength and cutting performance were evaluated similarly to Example 2. Table 8 shows the evaluation results.

TABLE 7

| | Starting Material | | Sintered Body | | | | | |
|---|---|---|---|---|---|---|---|---|
| Sample No. | Component of Coating Binder | Components of Various Binders other than Coating Binder | Volume Percentage of cBN Grains (%) | Volume Percentage of Al Compound (%) | cBN Contact Rate (%) | First Binder Phase and Mean Thickness (nm) | Grain Growth Suppressive Binder Phase and Volume Percentage (%) | Classification |
| 1 | TiAlN | — | 58 | 12 | 15 | TiN, TiAlN(cubic) 490 | AlN, $AlB_2$, $TiB_2$ 26 | Example |
| 2 | TiAlN | — | 57 | 12 | 15 | TiN, TiAlN(cubic) 490 | AlN, $AlB_2$, $TiB_2$ 22 | Example |
| 3 | TiAlN | — | 57 | 13 | 15 | TiN, TiAlN(cubic) 490 | $TiB_2$, $AlB_2$, AlN 19 | Example |
| 4 | TiAlN | — | 56 | 12 | 16 | TiN, TiAlN(cubic) 490 | $HfB_2$, $AlB_2$, AlN, $TiB_2$ 18 | Example |
| 5 | TiAlN | — | 60 | 13 | 15 | TiN, TiAlN(cubic) 490 | $AlB_2$, AlN, $TiB_2$ 13 | Example |
| 6 | TiAlN | — | 58 | 13 | 16 | TiN, TiAlN(cubic) 490 | WC, $AlB_2$, AlN, $TiB_2$ 18 | Comparative Example |
| 7 | TiAlN | — | 58 | 13 | 15 | TiN, TiAlN(cubic) 490 | $ZrO_2$, $AlB_2$, AlN, $TiB_2$ 21 | Comparative Example |
| 8 | — | TiN, TiAl | 58 | 13 | 63 | structure in which TiN, TiAlN(cubic), AlN, $AlB_2$ and $TiB_2$ segregate | | Comparative Example |

Although not added as starting materials, unavoidable impurities consisting of 1.5 to 2.0 volume % of $Al_2O_3$, 1.5 to 2.0 volume % of W, 0.05 to 0.1 volume % of Co, 0.05 to 0.1 volume % of Ni and 0.02 to 0.04 volume % of C were detected from the sintered bodies of the samples Nos. 1 to 7. Further, unavoidable impurities consisting of 6.0 volume % of $Al_2O_3$, 4.0 volume % of W, 1.0 volume % of Co, 0.15 volume % of Ni and 0.07 volume % of C were detected from the sintered body of the sample No. 8.

It is estimated that oxygen components and moisture having been absorbed by the starting materials and Al components reacted to form $Al_2O_3$ in the sintering process. It is estimated that other components such as W got mixed in starting material preparation, due to rubbing of a mixing vessel and the starting materials.

At this point, the samples Nos. 1 and 2 are cBN-based sintered bodies of the present invention employing binder-coated coated cBN grains by the step 2 containing AlN as grain growth suppressive binder phases. The sample No. 3 is a cBN-based sintered body of the present invention employing binder-coated cBN grains of the step 2 containing $TiB_2$ as a grain growth suppressive binder phase. The sample No. 4 is a cBN-based sintered body of the present invention employing binder-coated cBN grains of the step 2 containing $HfB_2$ as a grain growth suppressive binder phase.

TABLE 8

| No. | Transverse Rupture Strength (kgf/mm$^2$) | Flank Wear Width in 1 km Cutting (mm) | Cutting Distance up to Chipping (km) | Classification |
|---|---|---|---|---|
| 1 | 138 | 0.073 | 5.2 | Example |
| 2 | 138 | 0.061 | 5.5 | Example |
| 3 | 133 | 0.061 | 5.4 | Example |
| 4 | 136 | 0.060 | 5.4 | Example |
| 5 | 128 | 0.063 | 4.8 | Example |
| 6 | 115 | 0.080 | 3.3 | Comparative Example |
| 7 | 111 | 0.082 | 3.2 | Comparative Example |
| 8 | 110 | 0.076 | 3.0 | Comparative Example |

Referring to Table 7, TiAlN is partially decomposed·fused in sintering and reacts with cBN to form TiN, $AlB_2$, AlN and $TiB_2$ in the samples Nos. 1 to 7. It is estimated that the cBN-based sintered bodies having the compositions shown in Table 7 could thus be obtained.

As understood from the evaluation results of the samples Nos. 1 to 5, the strength (transverse rupture strength) of the cBN-based sintered bodies improve as the contents of the grain growth suppressive binder phases increase (see Table 8). This is conceivably because binder phases having fine structures were obtained due to the action of the grain growth suppressive binder phases. In this Example, such samples that the contents of the grain growth suppressive binder phases are not more than 25% in volume % exhibit superior wear resistance since the same can maintain the ratios of the binder phases consisting of nitrides of Ti and TiAl which are excellent in wear resistance in excess of constant levels.

In the samples Nos. 6 and 7, WC, $ZrO_2$ and the like are formed in the grain growth suppressive binder phases thereof. Affinity with the remaining binder phases of the cBN-based sintered bodies in this Example is low as compared with the compositions of the grain growth suppressive binder phases according to the present invention, and hence no improvement of wear resistance is observed although the same have homogeneous structures as compared with the cBN-based sintered body of the sample No. 8.

Examples disclosed this time must be considered as being illustrative and not restrictive in all points. The scope of the present invention is shown not by the above description but by the scope of claims, and it is intended that all modifications in the meaning and the range equivalent to the scope of claims are included.

According to the present invention, as hereinabove described, a high-pressure phase boron nitride-based high-hardness high-strength sintered body for cutting tools represented by a milling tool and an end mill, which is improved in wear resistance and chipping resistance, could be provided.

Industrial Availability

As hereinabove described, the high-pressure phase boron nitride-based sintered body according to the present invention is useful as a component for a cutting tool represented by an end mill and a milling tool or the like, as a component for a wear-resistant part provided on a sliding part, and further as a component for a shock-resistant part employed for a defensive wall or the like, and particularly suitably employed as a component for a cutting tool to which excellent wear resistance and chipping resistance are required.

We claim:

1. A high-pressure phase boron nitride-based sintered body comprising a plurality of grains (1) of high-pressure phase boron nitride and a binder phase (2, 3), wherein
   the content of said grains (1) is at least 20.0 volume % and not more than 99.7 volume %,
   said binder phase (2, 3) includes a first binder phase (2) enclosing said grains, and a second binder phase (3) other than that,
   said first binder phase (2) consists of the form of at least either a nitride of at least one of Ti, TiAl, Zr and Hf or a solid solution thereof,
   said second binder phase (3) includes a grain growth suppressive binder phase (4) between a plurality of said grains (1) enclosed with said first binder phase (2), and
   said grain growth suppressive binder phase (4) consists of the form of at least either a boride of at least one of Ti, Zr and Hf or a solid solution thereof, or the form of at least either a nitride or a boride of Al or a solid solution thereof.

2. The high-pressure phase boron nitride-based sintered body in accordance with claim 1, wherein the mean thickness of said first binder phase (2) is at least 5 nm and not more than 3000 nm.

3. The high-pressure phase boron nitride-based sintered body in accordance with claim 1, wherein said binder phase (2, 3) contains an Al compound being reactively formed during sintering with at least one of an Al metal, TiAlN or an intermetallic compound containing Al element serving as a start material.

4. The high-pressure phase boron nitride-based sintered body in accordance with claim 3, wherein the content of a binder phase part consisting of said Al compound is at least 0.1 volume % and less than 30.0 volume %.

5. The high-pressure phase boron nitride-based sintered body in accordance with claim 4, further comprising unavoidable impurities and a remaining binder phase other than said Al compound, the content of said unavoidable impurities being not more than 5.0 volume %.

6. The high-pressure phase boron nitride-based sintered body in accordance with claim 1, wherein transverse rupture strength being measured at a 4 mm span with a test piece of 6 mm in length, 3 mm in width and at least 0.4 mm and not more than 0.45 mm in thickness is at least 120 $kgf/mm^2$.

7. The high-pressure phase boron nitride-based sintered body in accordance with claim 1, wherein the ratio of the number of grains being in contact with other said grains (1) in a region containing at least 100 said grains (1) of high-pressure phase boron nitride is at least 0.1% and less than 20.0%.

8. The high-pressure phase boron nitride-based sintered body in accordance with claim 1, wherein at least more than 90% of remaining said grains (1) exist as single grains in case of performing dissolution treatment of at least 3 hours and not more than 5 hours under at least 120° C. and not more than 150° C. on a sintered body being brought into the form of such a quadrilateral that one side is at least 3 mm and not more than 7 mm and the thickness is at least 0.3 mm and not more than 0.5 mm with fluonitric acid being prepared by mixing 40 ml of that prepared by doubly diluting at least 60.0 weight % and not more than 65.0 weight % of nitric acid and 10 ml of hydrofluoric acid of at least 45.0 weight % and not more than 50.0 weight % in a closed vessel.

9. The high-pressure phase boron nitride-based sintered body in accordance with claim 1, wherein said high-pressure phase boron nitride is cubic boron nitride, and the half-power band width of the maximum strength line among diffraction lines of a component being decidable as the main in said binder phase (2, 3) is at least 1.4 times the half-power band width of a (111) diffraction line of said cubic born nitride in an X-ray diffraction pattern.

10. The high-pressure phase boron nitride-based sintered body in accordance with claim 1, wherein the mean grain size of said grains (1) is not more than 3 $\mu$m, and transverse rupture strength being measured at a 4 mm span with a test piece of 6 mm in length, 3 mm in width and at least 0.4 mm and not more than 0.45 mm in thickness is at least 140 $kgf/mm^2$.

11. The high-pressure phase boron nitride-based sintered body in accordance with claim 1, further comprising unavoidable impurities, a binder phase part consisting of an Al compound being reactively formed during sintering with at least one of Al, TiAl, $Ti_2AlN$, $Ti_3Al$ and $TiAl_3$ serving as a starting material and a remaining binder phase other than said Al compound, wherein
   said high-pressure phase boron nitride is cubic boron nitride,
   said first binder phase (2) consists of at least one of nitrides of Ti or TiAl,
   the content of said grains (1) is at least 45.0 volume % and not more than 75.0 volume %, the content of the binder phase part consisting of said Al compound is at least 1.0 volume % and not more than 20.0 volume %, the content of said unavoidable impurities is not more than 3.0 volume %, and the mean thickness of said first binder phase (2) is at least 5 nm and not more than 500 nm.

12. A high-pressure phase boron nitride-based sintered body comprising a plurality of grains (1) of high-pressure phase boron nitride and a binder phase (2, 3), wherein the content of said grains (1) is at least 20.0 volume % and not more than 99.7 volume %, said binder phase (2, 3) includes a first binder phase (2) enclosing said grains (1) and a second binder phase (3) other than that, said first binder phase (2) includes a third binder phase (5) being in contact with and enclosing said grains and a fourth binder phase (6) enclosing said third binder phase, said third binder phase (5) consists of the form of at least either a nitride or a boride of at least one of Ti, Zr, Hf and Al or a solid solution thereof, said fourth binder phase (6) consists of the form of at least either a nitride, a carbide or an oxide of at least one of Ti, TiAl, Zr and Hf or a solid solution thereof, said second binder phase (3) contains a grain growth suppressive binder phase (4) between a plurality of said grains being enclosed with said first binder phase, and said grain growth suppressive binder phase (4) consists of the form of at least either a boride of at least one of Ti, Zr and Hf or a solid solution thereof, or the form of at least either a nitride or a boride of Al or a solid solution thereof.

13. The high-pressure phase boron nitride-based sintered body in accordance with claim 12, wherein the mean thickness of said third binder phase (5) is at least 5 nm and not more than 500 nm, and the mean thickness of said fourth binder phase (6) is at least 5 nm and not more than 3000 nm.

14. The high-pressure phase boron nitride-based sintered body in accordance with claim 12, wherein said binder phase (2, 3) contains an Al compound being reactively formed during sintering with at least one of an Al metal, TiAlN or an intermetallic compound containing Al element serving as a starting material.

15. The high-pressure phase boron nitride-based sintered body in accordance with claim 14, wherein the content of a binder phase part consisting of said Al compound is at least 0.1 volume % and not more than 30.0 volume %.

16. The high-pressure phase boron nitride-based sintered body in accordance with claim 15, further comprising unavoidable impurities and a remaining binder phase other than said Al compound, the content of said unavoidable impurities being not more than 5.0 volume %.

17. The high-pressure phase boron nitride-based sintered body in accordance with claim 12, wherein transverse rupture strength being measured at a 4 mm span with a test piece of 6 mm in length, 3 mm in width and at least 0.4 mm and not more than 0.45 mm in thickness is at least 120 kgf/mm$^2$.

18. The high-pressure phase boron nitride-based sintered body in accordance with claim 12, wherein the ratio of the number of grains being in contact with other said grains (1) in a region containing at least 100 said grains (1) of high-pressure phase boron nitride is at least 0.1% and less than 20.0%.

19. The high-pressure phase boron nitride-based sintered body in accordance with claim 12, wherein at least more than 90% of remaining said grains (1) exist as single grains in case of performing dissolution treatment of at least 3 hours and not more than 5 hours under at least 120° C. and not more than 150° C. on a sintered body being brought into the form of such a quadrilateral that one side is at least 3 mm and not more than 7 mm and the thickness is at least 0.3 mm and not more than 0.5 mm with fluonitric acid being prepared by mixing 40 ml of that prepared by doubly diluting at least 60.0 weight % and not more than 65.0 weight % of nitric acid and 10 ml of hydrofluoric acid of at least 45.0 weight % and not more than 50.0 weight % in a closed vessel.

20. The high-pressure phase boron nitride-based sintered body in accordance with claim 12, wherein said high-pressure phase boron nitride is cubic boron nitride, and the half-power band width of the maximum strength line among diffraction lines of a component being decidable as the main in said binder phase (2, 3) is at least 1.4 times the half-power band width of a (111) diffraction line of said cubic born nitride in an X-ray diffraction pattern.

21. The high-pressure phase boron nitride-based sintered body in accordance with claim 12, wherein the mean grain size of said grains (1) is not more than 3 μm, and transverse rupture strength being measured at a 4 mm span with a test piece of 6 mm in length, 3 mm in width and at least 0.4 mm and not more than 0.45 mm in thickness is at least 140 kgf/mm$^2$.

22. The high-pressure phase boron nitride-based sintered body in accordance with claim 12, further comprising unavoidable impurities, a binder phase part consisting of an Al compound being reactively formed during sintering with at least one of Al, TiAl, Ti$_2$AlN, Ti$_3$Al and TiAl$_3$ serving as a starting material and a remaining binder phase other than said Al compound, wherein said high-pressure phase boron nitride is cubic boron nitride, said third binder phase (5) consists of the form of at least either a nitride or a boride of at least one of Ti and Al or a solid solution thereof, said fourth binder phase (6) consists of the form of at least either a nitride, a carbide or an oxide of at least one of Ti, TiAl, Zr and Hf or a solid solution thereof, the content of said grains (1) is at least 45.0 volume % and not more than 75.0 volume %, the content of the binder phase part consisting of said Al compound is at least 1.0 volume % and not more than 20.0 volume %, the content of said unavoidable impurities is not more than 3.0 volume %, the mean thickness of said third binder phase (5) is at least 5 nm and not more than 200 nm, and the mean thickness of said fourth binder phase (6) is at least 5 nm and not more than 500 nm.

* * * * *